United States Patent [19]

Fujino et al.

[11] 4,455,072
[45] Jun. 19, 1984

[54] SINGLE LENS REFLEX CAMERA

[75] Inventors: Masahisa Fujino; Akio Sunouchi, both of Tokyo; Tatsuo Konno; Ryuji Suzuki, both of Kanagawa, all of Japan

[73] Assignee: Canon Kabushiki Kaisha, Tokyo, Japan

[21] Appl. No.: 364,184

[22] Filed: Mar. 31, 1982

[30] Foreign Application Priority Data

Apr. 8, 1981 [JP] Japan .................................. 56-53664

[51] Int. Cl.³ ............................................. G03B 19/12
[52] U.S. Cl. .................................................... 354/153
[58] Field of Search ................................ 354/152, 153

[56] References Cited

U.S. PATENT DOCUMENTS

| | | | |
|---|---|---|---|
| 3,860,939 | 1/1975 | Uno | 354/153 |
| 4,003,066 | 1/1977 | Shono | 354/152 X |
| 4,160,592 | 7/1979 | Noack et al. | 354/153 X |
| 4,192,598 | 3/1980 | Sato et al. | 354/153 |
| 4,245,904 | 1/1981 | Satoh | 354/153 |
| 4,258,995 | 3/1981 | Karikawa et al. | 354/153 |
| 4,348,088 | 9/1982 | Yamamichi et al. | 354/152 |

*Primary Examiner*—John Gonzales
*Attorney, Agent, or Firm*—Toren, McGeady and Stanger

[57] ABSTRACT

A device for releasing shutter hold particularly for a single lens reflex camera including a shutter hold release device having a release mechanism for releasing the shutter hold wherein the driving power for the release mechanism is charged into the release mechanism in operative engagement of the charge of mirror driving power in a mirror driving mechanism of the device.

3 Claims, 3 Drawing Figures

SINGLE LENS REFLEX CAMERA

BACKGROUND OF THE INVENTION

1. Field of the Invention

The present invention relates to a shutter hold release mechanism for a single lens reflex camera for actuating shutter operation.

2. Description of the Prior Art

Various kinds of shutter releasing devices for releasing the hold of a shutter in a single lens reflex camera are known having a quick return mirror return, and have been proposed, whereby the most widely adopted of these is one which operates to directly release the hold member with the mirror driving member. Generally the shutter starts to run at the point in time at which the automatic diaphragm of the lens has been completely closed and the mirror has been entirely withdrawn into the photographing position, i.e., near the position at which the mirror driving member has been operated. Consequently in case of conventional devices it is necessary that the driving power charged in the mirror driving member have a sufficient strength to release the hold member at the position at which the operation is finished. Thus, it is necessary to provide overly large strength for mirror driving, so that the winding power is increased, while the durability of the parts is lowered, which is disadvantageous. Further, the viscosity of the oil for operating parts changes with change of the temperature so that the influence of temperature change upon the mirror driving member under the mirror driving load is large and therefore the operating speed changes. Further, the timing for releasing the hold member changes with the result that the shutter release timing becomes irregular.

One recent method to solve the above problem in a single lens reflex camera proposes that the shutter hold member release mechanism be provided separately. Namely, the hold release member is charged in operative engagement with the winding operation, the hold release mechanism is operated with a weak strength of the mirror withdrawal operation by the mirror driving mechanism during release operation and the shutter hold member is released with the moment of inertia and the large strength stored in the hold release member. Because the mechanism for carrying out this method necessitates an exclusive charge mechanism for charging the hold release mechanism the camera is more complicated in construction with the result that the cost is increased, while the timing adjustment of various driving mechanisms is complicated, which is disadvantageous.

SUMMARY OF THE INVENTION

An object of the present invention is to provide an improved shutter hold release device free from the shortcomings of conventional devices, whereby the shutter hold member release mechanism which has thus far required an exclusive charge mechanism is charged with the mirror driving member so as to release the shutter hold without increasing the mirror driving power, whereby virtually the same mechanism that constitutes the shutter hold member is directly released with the mirror driving member.

Another object of the present invention is to provide a shutter hold release device for the single lens reflex camera so designed that the mirror driving mechanism for controlling operation of the mirror into the photographing position is charged by the film winding operation, while the release mechanism which is to be charged in operative engagement with the charge operation is provided so as to be charged with the mirror driving mechanism at the time of the film winding operation. Thus, the mirror is retired into the photographing position with the mirror driving mechanism by means of the charge strength along with the charge operation and in operative engagement with the operation of the mirror driving mechanism the shutter is held with the shutter hold member and is released with the strength charged in the release mechanism.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
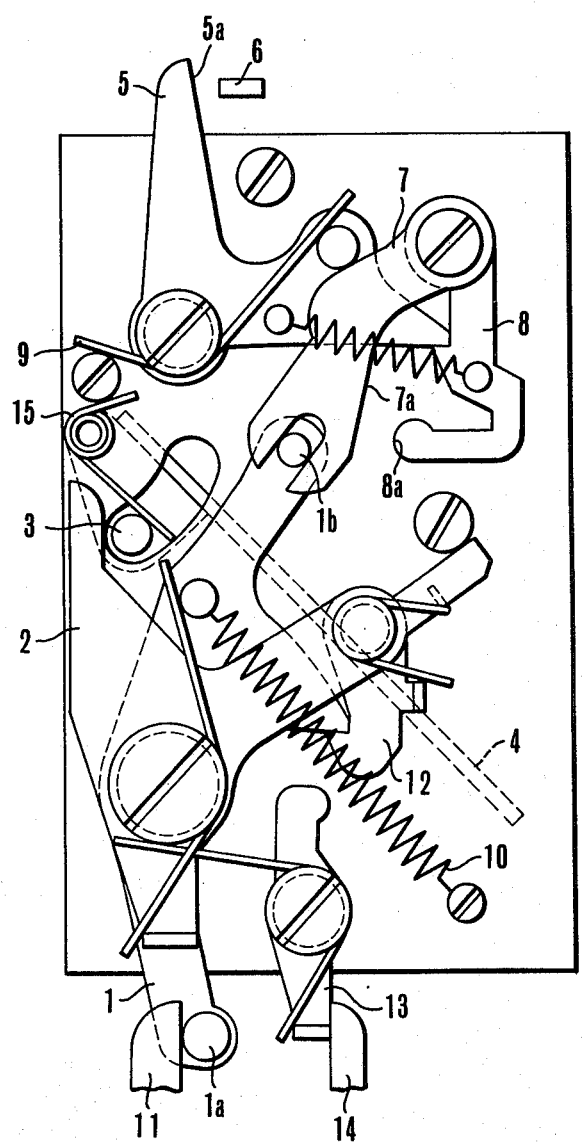
FIG. 1 is a schematic diagram showing an embodiment of the shutter hold release device in accordance with the present invention for a single lens reflex camera, wherein the mirror driving device is in the charged condition.
Figure 2:
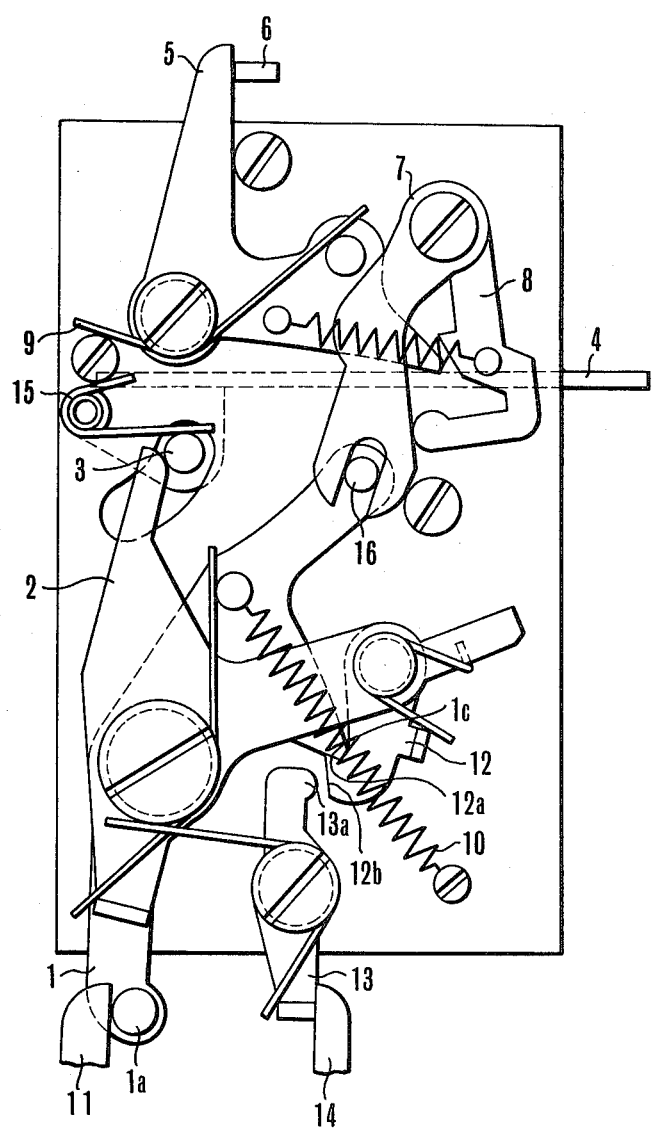
FIG. 2 is a schematic diagram showing the state of the device in FIG. 1 immediately after the mirror has moved into the photographing position and the shutter has started to run.
Figure 3:
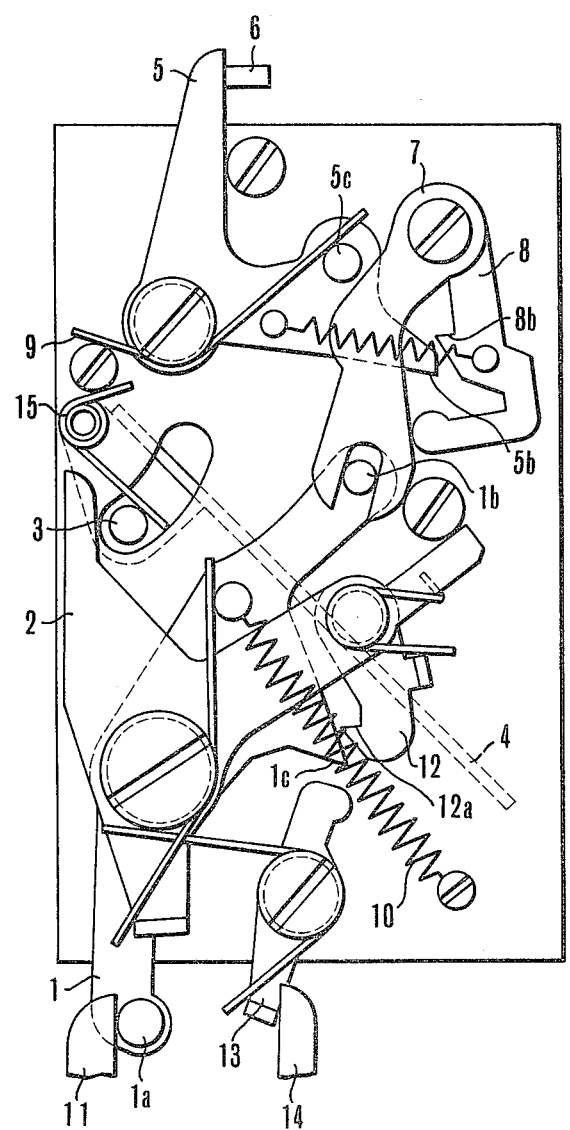
FIG. 3 is a schematic diagram showing the state of the device in FIG. 1 when the shutter has run and the mirror has resumed the viewing position.

FIGS. 1, 2, and 3 show an embodiment of the shutter hold release device of the present invention for a single lens reflex camera, wherein FIG. 1 shows the condition of the mechanism when a mirror driving device has been wound, FIG. 2 shows the condition when the shutter has started to run with the mirror having assumed the photographing position after shutter release, and FIG. 3 shows the condition where the mirror has resumed the initial position after the shutter has run. The mechanism of FIGS. 1, 2, and 3 includes a mirror 4 and a mirror charging lever 1, which is one of the components constituting the mirror driving mechanism, for charging a mirror driving spring 10. A leading curtain start lever 5 cooperates as the shutter hold release member with a leading curtain charge lever 7 acting as the connection member, and a mirror driving lever 2, one of the components constituting the mirror driving mechanism, for driving the mirror 4 cooperates with a mirror driving pin 3 secured on a mirror receiving plate for enabling the mirror 4 to be driven by the mirror driving lever 2. The mirror 4 moves out of the optical path at the time of a photographing operation and the leading curtain start lever 5, also one of the components constituting the shutter hold release mechanism, charged by a leading curtain start charge lever 7 releases a leading curtain hold lever 6 upon release of a hold lever 8 as the holding member. The leading curtain hold lever 6 is effective as the shutter holding member for directly holding the leading curtain and for allowing the curtain to start to run. The leading curtain start charge lever 7 is operatively engaged with the mirror charge lever 1 for charging the leading curtain start lever 5 upon film winding operation and for releasing the hold lever 8 with release operation of the camera so as to allow the leading curtain start lever 5 to be released. The holding lever 8 operates to hold the leading curtain start lever 5, and a release spring 9 biases the leading curtain start lever 5 clockwise. A driving spring 10 for operating the mirror driving lever 2 for withdrawing the mirror 4 into the photographing position is provided and a charge lever 11 operates toward the right and stops at a position at which the holding lever 8 and the mirror hook claw 12 are set and operates toward the left with the release operation so as to operate the mirror charge lever 2 with the mirror driving spring 10. A mirror hook claw 12, one of the components constituting the mirror driving mechanism, operatively connects the mirror charge lever 1 with the mirror driving lever 2 during mirror movement into the photographing position and a knock lever, one of the components constituting the mirror driving mechanism, releases the mirror hook claw 12 from the lever 1 in order to bring the mirror 4 out of the photographing position into the viewing position. A releasing lever 14 rotates the knock lever 13 along the clockwise direction when the shutter has run, and a mirror returning spring 15 holds the mirror 4 at the viewing position.

During operation of the shutter hold release device of the present invention, starting in the position shown in FIG. 1, the charge lever 11 is moved toward the left with a shutter release operation, while the mirror charge lever 1 is rotated clockwise by the force of the energized mirror driving spring 10. At this time, the mirror driving lever 2 is operatively engaged with the mirror charge lever 1 by the mirror hook claw 12 thereby operating to withdraw the mirror 4 into the photographing position shown in FIG. 2 by engagement with the mirror driving pin 3. At the same time, the leading start charge lever 7 which is operatively engaged with the mirror charge lever 1 by the pin 1b is rotated counterclockwise, bringing the part 7a of the leading curtain start lever 7 into contact with the part 8a of the hold lever 8 so as to disengage the leading start lever 5 from the hold lever 8. The leading curtain start lever 5 is rotated along the clockwise direction by the force of the energized release spring 9, whereby the part 5a energizes the leading curtain hold lever 6 so as to free the leading shutter curtain and cause it to start to run. FIG. 2 shows the above-described operating state wherein the tail shutter curtain has run and wherein the mirror release lever 14 moves toward the left with an engaging member (not shown) so as to rotate the knock lever 13 along the clockwise direction. Thus, the part 13a of the knock lever is in contact with the part 12b of the mirror hook claw 12 so as to disengage the part 1c of the mirror charge lever 1 from the part 12a of the mirror hook claw. Along with this disengagement, the mirror driving lever 2 resumes the viewing position together with the mirror 4 by operation of the mirror return spring 15. FIG. 3 shows the above-described operating state at which a sequence of film-exposure operations of the camera is completed. When a film winding operation is then actuated, the mirror release lever 14 operates toward the right out of the position shown in FIG. 3 so as to resume its original position. At the same time, the charge lever 11 is driven toward the right so as to charge the mirror charge lever 1 and at the same time charge the leading curtain start lever 5 via the pin 5c by means of the leading curtain charge lever 7 which is rotated along the clockwise direction by means of the pin 1b. The charge lever 11 stops at the position at which the part 12a of the mirror hook claw 12 and the part 1c of the mirror charge lever 1 are set, while the part 8b of the hold lever 8 and the part 5b of the leading curtain start lever 5 are set, whereby the state at which film winding is completed as shown in FIG. 1, is restored.

As has been explained so far in detail in accordance with the embodiments in the case of the device of the present invention the hold release mechanism of the shutter hold member is charged with the mirror driving mechanism so that a simple mechanism which does not need an exclusive charge mechanism can be realized in such a manner that the winding strength can be reduced, while the influence of temperature variation can be eliminated. Further, the space which has been necessary for the charge mechanism can be utilized for other purposes with the result that the device can be made more compact with a decrease in cost. Further, because a part of the mirror driving mechanism operates as a component of the hold release mechanism the adjustment of the mirror operation and the start of shutter running can be made easily in the same unit, which is quite convenient.

While a specific embodiment of the invention has been shown and described in detail to illustrate the application of the inventive principles, it will be understood that the invention may be embodied otherwise without departing from such principles.

What is claimed is:

1. A single lens reflex camera comprising:
  (a) a mirror movable between a first position where it reflects incident light coming through a lens of said camera to a finder and a second position for photographing;
  (b) a mirror driving mechanism which is moved from an exposure completion state to a film winding completion state by a film winding operation, said mechanism including a mirror driving spring which is charged by movement of said mirror driving mechanism from said exposure completion state to said film winding completion state so as to move said mirror from said first position to said second position, said mirror driving mechanism being moved by the spring force of said mirror driving spring from said film winding completion state to said exposure completion state so as to move said mirror from said first position to said second position;
  (c) a shutter hold release member movable from a first state to a second state by the charged force of a release spring to release a shutter holding state thereof by a shutter holding member at an exposure preventing position and to allow a front screen of a shutter to run, said release member being at said holding state when it is at said first state; and
  (d) a connection member operatively associated with said mirror driving mechanism and engageable with said release member, said connection member being engaged with said release member by movement of said mirror driving mechanism from said exposure completion state to said film winding completion state to move said release member to said first state in association with movement of said mirror driving mechanism while charging said release spring, said connection member releasing the holding action of said holding member by movement of said mirror driving mechanism from said film winding completion state to said exposure completion state and to move said release member from said first state to said second state by the charged force of said release spring.

2. A single lens reflex camera comprising:
(a) a mirror movable between a first position where it introduces incident light coming through a lens to a finder and a second position for photographing;
(b) a mirror driving mechanism which is moved from an exposure completion state to a film winding completion state by a film winding operation, said mechanism including a mirror driving spring which is charged by movement of said mirror driving mechanism from said exposure completion state to said film winding completion state so as to move said mirror from a first position to a second position, said mirror driving mechanism being moved by the spring force of said mirror driving spring from said film winding completion state to said exposure completion state so as to move said mirror from said first position to said second position;
(c) a shutter hold release member operatively connected to a release spring and movable from a first state to a second state by a charged force of said release spring;
(d) a holding member for holding said release member at said first state against the charged force of said release spring;
(e) a connection member associated with said mirror driving mechanism and engageable with said release member, said connection member being connected to said release member by movement of said mirror driving mechanism from said exposure completion state to said film winding completion state to associate said release member to movement of said mirror driving mechanism to shift said release member to said first state against the force of said release spring where the release member is held by said holding member, said connection member releasing the holding action of said release member by the holding member by movement of said mirror driving mechanism from said film winding completion state to said exposure completion state; and
(f) a shutter holding member for holding the front screen of a shutter at an exposure prevention position, said member releasing its holding action of said front screen of said shutter by movement of said release member from said first state to said second state.

3. A single lens reflex camera comprising:
(a) a mirror movable between a first position where it introduces incident light coming through a lens to a finder and a second position for photographing;
(b) a mirror charge lever movable from a first position to a second position by film winding operation of said camera and held at said second position, said holding of said lever being released by release operation of said camera;
(c) a mirror driving spring coupled to said charge lever and being charged by movement of said charge lever to said second position, said charge lever being driven from said second position with the charged force of said mirror driving spring by a release operation of said camera;
(d) a mirror driving lever engageable with said mirror charge lever when said mirror charge lever is moved from said first position to said second position, said mirror driving lever moving from a first position to a second position in association with movement of said mirror charge lever by a spring force, and being released from engagement with said mirror charge lever at the time of exposure completion to move from said second position to said first position, said mirror occupying said first position thereof when said mirror driving lever is at said first position thereof in association with said mirror driving lever, and occupying said second position thereof when said mirror driving lever is at said second position thereof;
(e) a shutter holding member for holding a front screen of a shutter of said camera;
(f) a hold release lever held at a first position and movable from said first position to a second position to release the holding action of said shutter holding member;
(g) a release spring coupled to said hold release lever, said release spring being charged when said release lever is at said first position and moving said release lever from said first position to said second position by its charged force when the holding action of said holding member is released by said hold release lever; and
(h) a connection member coupled to said mirror charge lever and engageable with said hold release lever, said connection member moving in association with movement of said mirror charge lever from said first position to said second position to move said hold release lever to said first position against said release spring, and releasing the holding action of said hold release lever at said first position in association with driving of said miorror charge lever from said second position by said mirror driving spring.

* * * * *